United States Patent [19]

Krabsen et al.

[11] Patent Number: 5,683,733
[45] Date of Patent: Nov. 4, 1997

[54] PLANT AND A METHOD OF TREATING MILK

[75] Inventors: Erik Krabsen, Herning; Niels Ottosen, Silkeborg; Lisbeth Knarrenborg, Herning, all of Denmark

[73] Assignee: APV Pasilac A/S, Aarhus, Denmark

[21] Appl. No.: 545,817

[22] PCT Filed: May 11, 1994

[86] PCT No.: PCT/DK94/00190

§ 371 Date: Feb. 28, 1996

§ 102(e) Date: Feb. 28, 1996

[87] PCT Pub. No.: WO94/26121

PCT Pub. Date: Nov. 24, 1994

[30] Foreign Application Priority Data

May 13, 1993 [DK] Denmark .................. 0561/93

[51] Int. Cl.⁶ .................. A01J 11/00; A23C 9/00
[52] U.S. Cl. .................. 426/491; 99/452; 99/456; 426/495; 426/522; 426/580
[58] Field of Search .................. 426/580, 491, 426/495, 522; 99/452, 456; 210/651

[56] References Cited

U.S. PATENT DOCUMENTS

| | | | |
|---|---|---|---|
| 4,075,355 | 2/1978 | Pato | 426/491 |
| 4,140,806 | 2/1979 | Glimenius et al. | 426/491 |
| 4,515,823 | 5/1985 | Kirschenmann | 426/491 |
| 4,569,759 | 2/1986 | Ben Aim et al. | 210/304 |
| 4,876,100 | 10/1989 | Holm et al. | 426/491 |
| 5,017,396 | 5/1991 | Lehmann et al. | 426/491 |
| 5,256,437 | 10/1993 | Degen et al. | 426/491 |
| 5,508,196 | 4/1996 | Mannweiler et al. | 435/289.1 |

FOREIGN PATENT DOCUMENTS

| | | |
|---|---|---|
| PS 194286 | 11/1990 | European Pat. Off. . |
| 3802305 | 10/1989 | Germany . |
| 4215339 | 4/1993 | Germany . |
| 15081-67 | 11/1967 | Sweden . |
| IE 62885 | 3/1995 | United Kingdom . |

OTHER PUBLICATIONS

"Neue Separatoren für die zentrifugale Entkeimung von Käsereimilch", dmz deutsche Molkereizeitung No. 45/1983, pp. 1392–1394.

van den Berg, Dasman & Stadhouders: "Baktofugering of ostemaelk" (Bactofugation of cheese milk), North European Food and Dairy Journal, Jul. 1989, pp. 63–68.

Karsten Bruun Qvist: "Mejeriteknologi" (Dairy technology), Aug. 1988.

Mejeriing: "Experiments on the effects of Bactofugation Nitrate Admixture and Pasteurization on the Quality of Cheese", (Statens Forsøgsmejeri), front page and p. 8.

*Membrane Handbook* "Theory for Crossflow Microfiltration" by Robert H. Davis, p.480 1992.

Primary Examiner—George Yeung
Attorney, Agent, or Firm—Lowe, Price, LeBlanc & Becker

[57] ABSTRACT

A plant and a method of treating milk so as to obtain milk with a low content of spores and bacteria. In a centrifugation unit (4) the milk is separated into a cream fraction (CR) and a skim-milk fraction. The skim-milk fraction is separated in a microfiltration unit (8) into a spore and bacteria-containing retentate (R) and a permeate (P) with a low content of spores and bacteria. The cream fraction (CR) is sterilized in a sterilizing unit (16), and the sterilized cream (STCR) or a portion thereof is mixed with the permeate (P) into standardized milk. The retentate is recirculated to the centrifugation unit (4) which is of the type separating the material into the cream fraction (CR), the skim-milk fraction (SM), and furthermore a sludge fraction (SL). The plant and the method ensure a high microfiltration capacity and the cheese formation properties of the milk is maintained.

8 Claims, 2 Drawing Sheets

PLANT AND A METHOD OF TREATING MILK

TECHNICAL FIELD

The present invention relates to a plant for treating milk so as to obtain milk with a low content of spores and bacteria, said plant comprising a centrifugation unit separating the milk into a cream fraction and a skim-milk fraction, a conduit for the skim-milk fraction coupled to a microfiltration unit separating the skim-milk fraction into a spore and bacteria-containing retentate and a permeate with a low content of spores and bacteria for a conduit for the retentate, and a conduit, respectively, for the permeate, a conduit for the cream fraction coupled to a sterilizing unit, which in turn is coupled to a conduit for sterilized cream coupled to a uniting conduit coupled to the permeate conduit and uniting the sterilized cream or a portion thereof and the permeate in a conduit coupled thereto for standardized milk. The invention relates furthermore to a method of treating milk so as to obtain milk with a low content of spores and bacteria, where the milk is subjected to a centrifugation causing a separation into a spore and bacteria-containing cream fraction and a spore and bacteria-containing skim-milk fraction, where the spore and bacteria-containing skim-milk fraction is subjected to a microfiltration resulting in a separation into a retentate in the form of a spore and bacteria-containing concentrate and a permeate in the form of a substantially sterile skim-milk fraction, and where the sterilization of the cream fraction is followed by a mixing thereof with the substantially sterile skim-milk fraction so as to obtain milk with the desired content of fat.

BACKGROUND ART

Danish printed accepted application No. 164,722 and the corresponding EP-PS No. 194,286 disclose a plant for treating milk in such a manner that the milk has a low content of bacteria. Whole milk is divided by centrifugation into a cream fraction and a skim-milk fraction. The skim-milk fraction is caused to pass a microfilter where fat globules and bacteria are separated off. The microfiltration results in a permeate consisting of skim milk with a low bacterial content and a concentrate (retentate) with a higher fat content than the permeate. The concentrate is mixed with the cream fraction resulting from the centrifugation, and the mixture is sterilized. The sterilized material or a portion thereof is combined with the permeate to obtain milk with the desired fat content. The advantage of this known method is that only a minor fraction need to be sterilized in order nevertheless to obtain standardized milk with a low content of bacterial. The combination of a centrifugal separation and microfiltration provides a significantly increased capacity of the microfilter.

The retentate fraction from the microfiltration usually contains a rather high quantity of proteins and enzymes. Thus the use of the known plant is encumbered with the drawback that it is necessary to subject the retentate fraction to the vigorous heat treatment involved in a sterilizing process. As a result, the proteins are subjected to a more or less expressed conversion due to denaturation, and the enzymes are completely or partially destroyed, which means that the milk is deteriorated and for instance less suited for the production of cheese. Thus the sterilization may have an unfortunate effect on the cheeseability (i.e. cheese formation properties) as well as on the taste and ripening conditions of the cheese. By the cheeseability of the milk is inter alia meant the ability of the milk to form a satisfying coagel by addition of rennet. When the cheeseability of the milk is reduced, it can be difficult to obtain an optimum quality of the cheese with respect to water-content, solidity and texture. The problems of a reduced cheeseability are well-known in connection with production of cheese from milk having been subjected to a too vigorous heat treatment.

BRIEF DESCRIPTION OF THE INVENTION

The object of the present invention is to avoid the above vigorous heat treatment of the proteins and enzymes present in the retentate while the improved capacity of the microfilter resulting from a combination of the centrifugation and the microfiltration is maintained.

The above is obtained by the plant and the method according to the invention.

The invention relates to a plant of the above type and characterised in that the retentate conduit is in form of a recirculating conduit to the centrifugation unit, and that the centrifugation unit is of the type separating the material into the cream fraction, the skim-milk fraction, and a sludge fraction as well.

The invention relates furthermore to a method of the above type and characterised by recirculating the spore and bacteria-containing retentate resulting from the microfiltration to the centrifugation, and by said centrifugation being a centrifugation known per se and resulting in the cream fraction, the skim-milk fraction as well as in a sludge fraction containing a major part of the present spores and bacteria.

The plant and the method according to the invention ensure that valuable ingredients in the retentate resulting from the microfiltration are not subjected to a destroying sterilization at the same time as it is nevertheless possible that these substances end up in the completely standardized milk which can still be produced with a low content of bacteria and bacterial spores.

The extent of applicability of the invention appears from the following detailed description. It should, however, be understood that the detailed description and the specific examples are merely included to illustrate the preferred embodiments, and that various alterations and modifications within the scope of protection will be obvious to persons skilled in the art on the basis of the detailed description.

BRIEF DESCRIPTION OF THE DRAWING

The invention is described in greater detail below with reference to the accompanying drawing and examples. In the drawing

Figure 1:
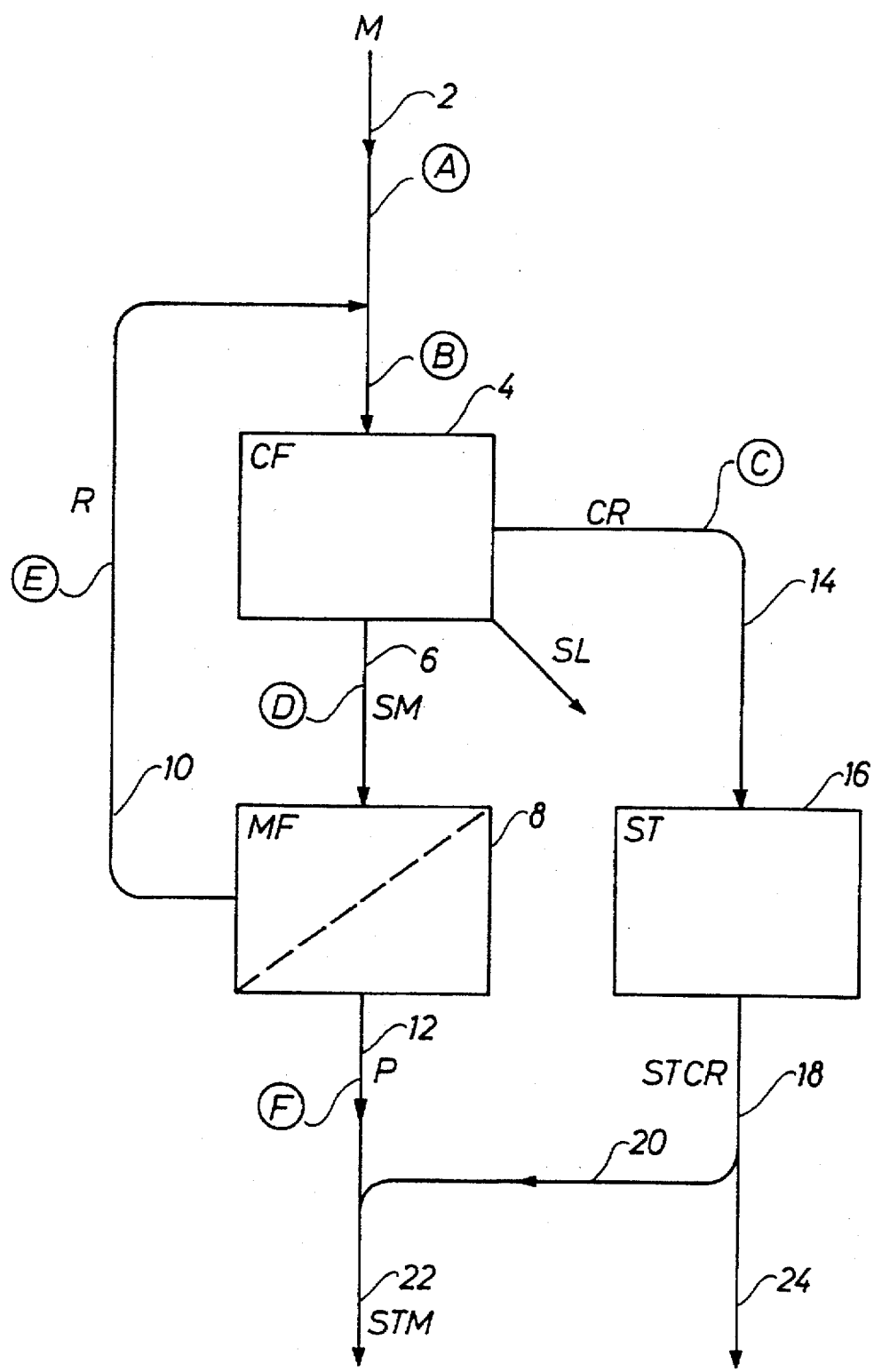
FIG. 1 illustrates a block diagram of the principle of the plant and the method according to the invention.

In the drawing the following abbreviations have been used:
M: Milk
CF: Centrifugation
CR: Cream
SM: Skim milk
SL: Sludge
MF: Micro filtration
ST: Sterilization
R: Retentate
P: Permeate
STCR: Sterilized cream
STM: Standardized milk

DETAILED DESCRIPTION OF THE INVENTION

The principle of the method and the plant according to the invention appears from FIG. 1, in which raw milk M passes through a conduit 2 to a centrifugation unit 4. In the centrifugation unit 4 the milk is separated into a cream fraction CR, a skim-milk fraction SM, and bacteria-containing sludge SL. The skim-milk fraction is carried through a conduit 6 to a microfiltration unit 8, where a separation is performed into a bacterial spore and bacteria-containing retentate R and a permeate P with a low content of bacterial spore and bacteria. Through a conduit 10 the retentate R is returned to the centrifugation unit. The cream fraction CR resulting from the centrifugation contains also some bacterial spores and bacteria and is carried through a conduit 14 to a sterilization unit 16 in which the cream is sterilized in a conventional manner. The sterile cream STCR is carried away through a conduit 18 and can, if desired, be divided into an excess cream carried away through a conduit 24 as well as a portion carried through a conduit 20 so as to be mixed with the permeate with a low content of spores and bacteria in a conduit 22 for standardized milk. Most of the bacteria and spores contained in the skim-milk fraction resulting from the centrifugation are collected in form of a retentate at the microfiltration and returned to the centrifugation, where a sludge SL with a high content of bacteria and spores is separated during the centrifugation.

Figure 2:
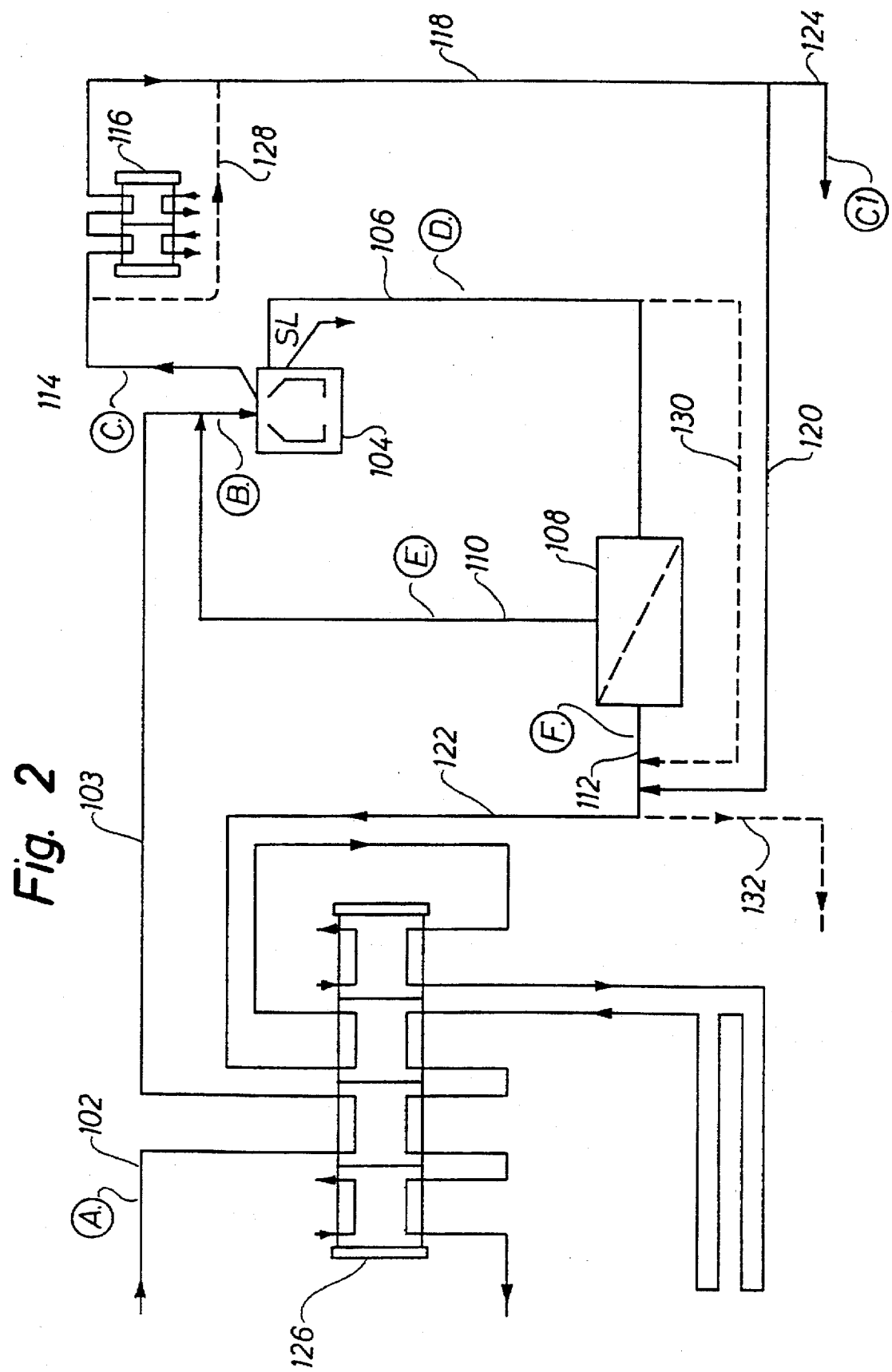
FIG. 2 is a flow diagram of an embodiment of the plant and the method according to the invention.

In the embodiment shown in FIG. 2 of the plant and the method according to the invention, the raw milk A is introduced at a temperature of 2° to 10° C., preferably 3° to 6° C., through a conduit 102 to a pasteurizer 126, where the milk is heated to 45° to 65° C., preferably 50° to 60° C. Then the milk is carried through a conduit 103 to a centrifuge 104, where said milk is divided into a skim-milk fraction D carried at a temperature of 45° to 65° C., preferably 50° to 60° C., through a conduit 106, and a cream fraction C carried also at the centrifugation temperature of 45° to 65° C., preferably 50° to 60° C., through a conduit 114, as well as into a sludge fraction with a high content of bacteria. The skim milk D is carried to a microfiltration unit 108, in which it is divided into a permeate F and a retentate E. The retentate E carried away through a conduit 110 and recirculated so as to be mixed with the raw milk in the conduit 103 to the centrifuge 104. The permeate resulting from the microfiltration unit F contains skim milk with a low content of spores and bacteria and is carried from the microfiltration unit through a conduit 112. The cream C is carried to a sterilization unit in form of a cream pasteurizer, where said cream is heated to 70° to 150° C., preferably 110° to 130° C., for 0.5 to 25 seconds, whereafter it is again cooled to 45° to 65° C., preferably 50° to 60° C., and carried away through a conduit 118. The desired portion of the sterilized cream is carried through a conduit 120 so as to be mixed with the skim-milk permeate F with a low content of bacteria in a conduit 122 in form of so-called standardized milk, i.e. milk with a standardized content of fat. The remaining portion of the cream $C_1$ is carried away through a conduit 124. The standardized milk being at an operating temperature of 45° to 65° C., preferably 50° to 60° C., is carried to the pasteurizer 126. Here it is initially pasteurized by way of heating to 60° to 105° C., preferably 70° to 90° C., for 0° to 25° seconds, preferably 10 to 15 seconds, and subsequently cooled to 2° to 10° C., preferably 3° to 6° C. As illustrated in FIG. 2, the plant shown is also structured such that it is possible to cause the cream to by-pass the cream pasteurizer 116 through a conduit 128. In addition a by-pass 130 is provided which allows the skim milk resulting from the centrifuge 104 to by-pass the microfiltration unit 108. Furthermore an outlet 132 is provided which allows removal of the standardized milk without pasteurization.

The centrifugation unit used in the plant according to the invention can be any centrifugation unit which also can separate a sludge with a high content of bacteria and bacterial spores in addition to the conventional way of dividing the milk into skim milk and cream.

Thus the centrifugation unit can be a self-purifying or non-self-purifying separator centrifuge. In a non-self-purifying centrifuge, the sludge settles in form of a cake inside the centrifuge and must be manually removed upon termination of the production. Self-purifying separator centrifuges have been marketed lately, said centrifuges advantageously forming part of the plant according to the present invention in form of the centrifugation unit. Such self-purifying centrifuges separate automatically the sludge at regular intervals without necessitating a stop of the centrifuge and consequently of the production. An example of such a self-purifying or de-sludging separator centrifuge has been described in U.S. Pat. No. 5,017,396 (Lehmann et al.).

Although the use of centrifuges involving a manual or an automatic separation of sludge are preferred, it should be understood that any centrifugation unit capable of dividing the milk into skim milk, cream, and bacterial sludge can form part of the plant according to the invention.

Thus it is for instance also possible to use a conventional bactofugation plant with a conventional separator centrifuge combined with a bactofuge.

In the present description, the fat content and the protein content are indicated in a conventional manner in the various fractions in form of % by weight relative to the dry-matter content of the fraction.

The centrifugation is usually performed in such a manner that the following fractions are obtained from the milk, calculated in % by weight based on the milk fed to the centrifugation unit.

Cream 6 to 14% by weight, preferably 8 to 12% by weight, fat content 30 to 50% by weight, preferably 37 to 43% by weight, protein content 2.0 to 2.3% by weight, preferably 2.1 to 2.2% by weight.

Skim milk 86 to 94% by weight, preferably 88 to 92% by weight, fat content 0.03 to 0.1% by weight, preferably 0.04 to 0.06% by weight.

protein content 2.8 to 4.5% by weight, preferably 3.1 to 3.5% by weight.

Sludge 0.01 to 0.5% by weight, preferably 0.05 to 0.1% by weight.

The microfiltration unit of the plant according to the invention can comprise one or more microfiltration membranes. When several microfiltration membranes are used, said membranes can be coupled in various manners, such as in series or in parallel. Such couplings of several filtration membranes are well-known to persons skilled in the art.

The plant according to the invention can in principle use any microfiltration membrane suited for filtration of milk and milk products. In order to illustrate this technique reference can for instance be made to U.S. Pat. No. 4,140,806 (Glimenius et al.). The membrane can be made of various materials, especially ceramic or organic materials, such as aluminium-oxide, zirconium oxide, titanium oxide or mixtures thereof, polysulphones, fluoropolymers, such as membranes of the FSM-series by Dow Danmark A/S, Nakskov, Denmark, cellulosis acetate, polyethersulphones,

TABLE 1

|  | A<br>Raw Milk | B<br>Raw Milk + Retentate | C<br>Cream | D<br>"Raw" Skim Milk | E<br>Retentate | F<br>Permeate |
|---|---|---|---|---|---|---|
| Total colony count/ml | 370,000 | 450,000 | 70,000 | 420,000 | 1,210,000 | 91 |
| Bacterial spores ml | 20 | 70 | 5 | 60 | 600 | <1 |
| Protein % | 3.30 | 3.41 | 2.13 | 3.55 | 4.10 | 3.49 |
| Fat % | 4.40 | 4.09 | 40.0 | 0.05 | 0.14 | 0.04 |
| Amount kg/h | 1,000 | 1,099 | 111 | 988 | 99 | 889 | and polyvinyl difluoride (PVDF). The membrane is usually of a pore size in the range 0.08 µm to 2.5 µm corresponding to a molecular cutoff value of 150,000 to 5,000,000, preferably 0.8 to 1.4 µm.

Microfiltration membranes capable of forming part of the microfiltration unit can be constructed in any suited manner, such as in form of a so-called plate-and-frame system, a tubular system, a cassette system or according to the hollow fiber principle.

The microfiltration causes a separation of the skim-milk fraction into a retentate and a permeate:

Retentate 6 to 14% by weight, preferably 8 to 12% by weight of the skim-milk fraction, fat content 0.07 to 0.21, preferably 0.10 to 0.18% by weight, protein 3.6 to 4.6, preferably 3.9 to 4.3% by weight.

Permeate 86 to 94, preferably 88 to 92% by weight relative to the skim-milk fraction, fat 0.02 to 0.06, preferably 0.03 to 0.05% by weight, protein 3.1 to 3.8, preferably 3.2 to 3.7% by weight.

The permeate presents a very low content of bacteria and bacterial spores, such as a total colony count of less than 100 per ml and with a spore content of less than 1 per ml.

The desired heating and cooling of the various material flows in the plant according to the invention, including pasteurization and sterilization, can be performed in any suitable manner. Usually plate heat exchangers are used, but tubular heat exchangers can also be used. It is also possible to use a so-called infusion system or the like for the pasteurization and sterilization, where the treated material comes into direct contact with steam.

Example

The present examples illustrates the use of the plant according to the invention on the basis of the principle shown in FIG. 2.

The individual material flows are indicated in both FIG. 1 and FIG. 2 and include the following:
Raw milk
Raw milk combined with the retentate resulting from the microfiltration.
C: Cream fraction resulting from the centrifugation.
$C_1$: Excess cream.
D: "Raw" skim milk.
E: Retentate resulting from the microfiltration.
F: Permeate resulting from the microfiltration, i.e. skim-milk without bacteria and spores.

In Table 1, a mass balance for the indicated fractions is shown.

A post-calculation of the number values seen relative to the indicated amounts reveal that the total number of germs in the retentate E+the permeate F is lower than the corresponding number of the feeding material (raw skim milk, D) added to the microfilter. This is due to the fact that some of the bacteria die during the stay at 50° to 60° C. in the microfiltration unit.

In addition it appears that the total number of germs of the raw skim milk D+cream C is lower than the total number of germs in the feeding material to the centrifugation unit (B: raw milk+retentate). Unlike the above this is due to the fact that a significant quantity of bacteria are removed together with the sludge separated from the centrifuge.

It is obvious from the above description of the invention that it can be varied in many ways. Such variations are not to be considered deviations from the scope and idea of the invention, and all such modifications obvious to persons skilled in the art are also to be considered comprised by the following claims.

We claim:

1. A plant for treating milk so as to obtain milk with a low content of spores and bacteria, said plant comprising
   a centrifugation unit (4) for separating the milk into a cream fraction (CR), a skim-milk fraction (SM) and a sludge fraction (SL);
   a conduit (6) for the skim-milk fraction;
   a microfiltration unit (8) for separating the skim-milk fraction (SM) into a spore and bacteria-containing retentate (R) and a permeate (P) with a low content of spores and bacteria;
   a conduit (10) for the retentate (R), which retentate conduit (10) is in form of a recirculating conduit to the centrifugation unit (4);
   a conduit (12), for the permeate (P);
   a conduit (14) for the cream fraction (CR);
   a sterilizing unit (16);
   a conduit (18) for sterilized cream (STCR);
   a uniting conduit (20) uniting the sterilized cream (STCR) or a portion thereof and the permeate in a conduit (22) coupled thereto for standardized milk in which said conduit (6) is coupled to said microfiltration unit (8), said conduit (14) is coupled to said sterilizing unit (16), said sterilizing unit is coupled to said conduit (18), said conduit (18) is coupled to said uniting conduit (20), and said uniting conduit (20) is coupled to said permeate conduit (12).

2. A plant as claimed in claim 1, wherein the centrifugation unit comprises a separator centrifuge with separation of sludge.

3. A plant as claimed in claim 2, wherein the separator centrifuge is a self-purifying separator centrifuge.

4. A plant as claimed in claim 1, wherein the microfiltration unit comprises one or more microfiltration membranes selected from the group consisting of plate-and-frame-system, a tubular system, a cassette system, a hollow fiber membrane and a combination thereof.

5. A plant as claimed in claim 1, wherein the microfiltration unit comprises one or more microfiltration membranes of a pore size of 0.4 to 2.0 µm.

6. A plant as claimed in claim 5, wherein the pore size is 0.8 to 1.4 µm.

7. A plant as claimed in claim 1, wherein the sterilizing unit is of a type selected from the group consisting of a plate-shaped heat exchanger, a tubular heat exchanger, an infusion system and a combination thereof.

8. A method of treating milk so as to obtain milk with a low content of spores and bacteria, comprising the steps of:

centrifuging the milk into a spore and bacteria-containing cream fraction, a spore and bacteria-containing skim-milk fraction and a sludge fraction containing a major part of the present spores and bacteria;

microfiltrating the spore and bacteria-containing skim-milk fraction into a retentate in the form of a spore and bacteria-containing concentrate and a permeate in the form of a substantially sterile skim-milk fraction;

sterilizing the cream fraction;

mixing the sterilized cream fraction with the substantially sterile skim-milk fraction so as to obtain milk with the desired content of fat; and recirculating the spore and bacteria-containing retentate resulting from the microfiltrating step to the centrifuging step.

\* \* \* \* \*